United States Patent Office 3,198,762
Patented Aug. 3, 1965

3,198,762
COPOLYMERIZATION PRODUCTS OF QUATERNARY VINYL ETHERS AND AQUEOUS EMULSIONS THEREOF
Arthur Maeder, Basel, and Otto Albrecht, Neuewelt, near Basel, Switzerland, assignors to Ciba Limited, Basel, Switzerland, a Swiss firm
No Drawing. Filed Dec. 28, 1955, Ser. No. 556,017
Claims priority, application Switzerland, Oct. 30, 1953, 98,108/53; Oct. 5, 1954, 10,959/54
2 Claims. (Cl. 260—29.6)

This is a continuation-in-part of our copending application Ser. No. 464,600, filed October 25, 1954, now Patent 2,897,200.

This invention is based on the observation that vinyl ethers which contain at least one quaternary nitrogen atom which is not bound to a hetero-atom through a methylene bridge, are valuable compounds for the manufacture of copolymers. The statement that the quaternary nitrogen atom must not be bound to a hetero-atom through a methylene bridge means that at least two carbon atoms must lie between said nitrogen atom and the nearest hetero-atom. The hetero-atom can be an oxygen, a sulfur or a nitrogen atom. As starting materials for making the quaternary ammonium compounds there are suitable vinyl ethers, which contain at least one tertiary amino group which is not bound to a heteroatom by a methylene bridge. Such compounds are known or can be made by methods in themselves known. There may be used compounds which contain aliphatic, aromatic or hetero-cyclic residues. There also come into consideration compounds which contain a component capable of undergoing hardening. This compound can be obtained by the action of a suitable basic vinyl ether on a formaldehyde condensation product of an amino-triazine compound or a urea compound. Among the compounds suitable for conversion into quaternary ammonium compounds the following examples may be mentioned:

$(CH_3)_2N-CH_2CH_2-O-CH=CH_2$
$(CH_3)_2N-CH_2C(CH_3S)_2-O-CH=CH_2$
$(C_2H_5)_2N-CH_2CH_2-O-CH=CH_2$
$(HOCH_2CH_2)_2N-CH_2CH_2-O-CH=CH_2$
$(CH_3)_2N-CH_2CH_2NH-CH_2CH_2-O-CH=CH_2$
$[HOCH(CH_3)CH_2]_2N-CH_2CH_2-O-CH=CH_2$ $(CH_3)_2CH$
　　＼
　　　N—$CH_2CH_2$—O—CH=$CH_2$
　　／
$(CH_3)_2CH$ $CH_3$
　＼
　　N—$CH_2CH_2$—O—CH=$CH_2$
　／
$C_2H_5$ $(HC-CH_2CH_2)_2N-CH_2CH_2-O-CH=CH_2$
$(C_2H_5)_2N-CH_2-CH(CH_3)-O-CH=CH_2$
$(CH_3)_2N-CH_2CH_2CH_2CH_2-O-CH=CH_2$
$(CH_3)_2N-(CH_2)_3-O-CH=CH_2$
$(CH_3)_2N-CH_2CH_2-O-CH_2CH_2-O-CH=CH_2$
$(CH_3)_2N-CH_2CH_2-O-CH_2CH_2$
　　　　　　　　　—O—$CH_2CH_2$—O—CH=$CH_2$
$(CH_3)_2N-CH_2CH_2-O-CH_2CH_2-O$
　　　—$CH_2CH_2$—O—$CH_2CH_2$—O—CH=$CH_2$

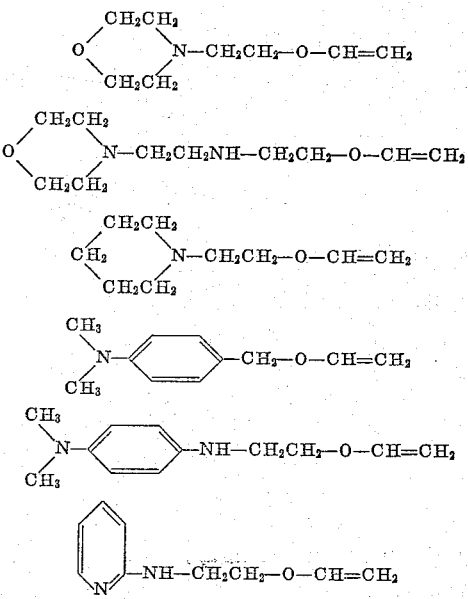

Advantageously, those compounds are used which contain only one tertiary amino group and which have only aliphatic residues or aliphatic and heterocylic residues in the molecule, or those, in so far as they contain aromatic residues, which possess only one such aromatic residue, namely, a six-membered ring, that is to say a benzene residue which can be substituted, if desired.

The quaternation of the vinyl ethers may be carried out by methods in themselves known by the action of compounds which are capable of converting a tertiary amino group into a quaternary ammonium group, and there come into consideration more especially the usual alkylating or aralkylating agents, such as dimethylsulfate, methyliodide, benzylchloride and nuclear substitution products thereof. Especially advantageous is the use of such quaternating agents as contain a reactive atom grouping. Under the expression reactive atom grouping are to be understood, for example, epoxy groups, movable halogen atoms, acetal groups and more especially hydrogen atoms bound to hetero-atoms. There come into consideration hydroxyl groups, amide groups, N-methylol-amide groups; especially advantageous quaternating agents are epichlorhydrin and chloracetamide. The use of quaternating agents with reactive atom groupings has the advantage that compounds are formed which, in addition to being polymerizable, are capable of further reactions, which properly copolymerization products prepared from monomeric compounds usually also possess. Such monomeric or polymeric compounds can, for example, be used for cross-linking reactions. If salts of vinyl ethers are used with a tertiary amino group, alkylene oxides, such as ethylene oxide may be used as quaternating agents.

The new quaternary ammonium compounds are water-soluble in the monomeric condition, provided that they have been derived from the usual inorganic or organic acids. They are advantageously polymerized jointly with other monoethylenically unsaturated, polymerizable compounds.

The polymerization may be carried out in bulk, in solution or in emulsion, the usual conditions employed in polymerization techniques being used. Thus, it is of advantage to use a polymerization catalyst. The usual compounds which catalyse polymerization may be added. For the polymerization of the vinyl ethers alone there may be used the usual Friedel-Crafts catalysts such as aluminium chloride, boron fluoride or stannic chloride. For the purpose of copolymerization there may be used catalysts, such as organic or inorganic peroxides, or per-salts, for example, peracetic acid, acetyl peroxide, benzoyl peroxide, benzoyl-acetylperoxide, lauryl peroxide, cumenehydroperoxide, tertiary butylhydro-peroxide, paramethanehydroperoxide, hydrogen peroxide, percarbonates, persulfates or perborates. The proportions in which they are added depends, as is known, on the course of reaction desired and on the properties desired in the polymer. If desired, a plurality of agents catalyzing the polymerization may be used. The action of the polymerization catalysts may be enhanced by the simultaneous action of heat and/or actinic rays. Alternatively, the polymerization may be brought about by heat heat and/or actinic rays without the addition of a catalytic compound. In order to modify the speed of the polymerization and the molecular weight of the polymer, so-called regulators such, for example, as mercaptans, terpenes or the like may be added.

It is also of advantage to carry out the polymerization in the absence of air or oxygen and in the presence of an inert gas, such as nitrogen or carbon-dioxide. In addition to the aforesaid catalysts and regulators, so-called activators may be used. Such activators are, for example, inorganic oxidizable oxygen-containing sulfur compounds such as sulfur dioxide, sodium bisulfite, sodium sulfite, ammonium bisulfite, sodiumhydrosulfite or sodium thiosulfate. By using simultaneously an activator and a polymerization catalyst yielding oxygen a so-called Redox system is formed, which favorably influences the polymerization process. As activators there may also be used water-soluble aliphatic tertiary amines such as triethanolamine and diethyl-ethanolamine. The action of the polymerization catalyst can be accelerated by the addition of a heavy metal compound, which is capable of existing in more than one valency stage and is present in a reduced condition, or by addition of a complex cyanide of iron, cobalt, molybdenum, mercury, zinic, copper or silver or a mixture of such complexes. When the polymerization is carried out in emulsion, the monomeric compounds are advantageously emulsified with the aid of emulsifying agents; as emulsifying agents there come into consideration those of the cation-active or non-ionogenic character. Among the cation-active emulsifying agents there may be used, for example, compounds of higher fatty amines with acetic acid, hydrochloric acid or sulfuric acid, such as octa-decylamine acetate, (dodecyl)-diethyl-cyclohexylamine-sulfate and also salts of diethyl amino-ether esters and fatty acids or salts of the type of oleylamidoethyl-diethyl-amino acetate

There are also suitable quaternary ammonium compounds, such as cetyl-dimethyl-benzylammonium-chloride, cetyl-trimethyl-ammonium bromide, para-(trimethylammonium)-benzoic acid acetyl ester-methosulfate, cetyl-pyridinium-metho-sulfate, octadecyltrimethyl-ammonium bromide or the quaternary compound obtained from diethylsulfate and triethanolamine-tristearate.

Among the non-ionogenic emulsifying agents there may be mentioned polyglycol ethers and fatty acids, fatty amines or fatty alcohols of high molecular weight such as cetyl alcohol, oleyl alcohol or octadecyl alcohol, for example, the reaction product of 15–30 mols of ethylene oxide and one mol of the fatty alcohol. There may also be used emulsifying agents having a wetting action such as octylphenolpolyglycol ethers, and also lauryl alcohol polyglycol ethers or polyhydric alcohols partially esterified with higher fatty acids, for example, glycerine monolaurate, or sorbitol monlaurate. There may also be used mixtures of such emulsifying agents, or mixtures of such emulsifying agents with protective colloids such as polyvinyl alcohols, partially hydrolyzed polyvinylesters, and also starches or starch derivatives, for example, dextrin and furthermore cellulose ethers, polyethylene oxides, and generally water-soluble polymers or copolymers which contain free hydroxyl, amino or carboxylic acid amide groups. Finally, such a protective colloid may be used alone.

When the polymerization is carried out in solution there may be used a solvent in which only the monomeric compounds are soluble and in which the polymers are insoluble. However, there may also be used solvents in which the polymers are also soluble. Suitable solvents are, for example water and organic solvents, such as methylene chloride or dichloro-ethane.

The polymerization may be carried out at ordinary temperatures, but more advantageously at a raised temperature. Suitable temperatures are, for example, 40–95° C. and especially 55–90° C. In some polymerizations there is often a considerable amount of heat liberated, so that it is necessary to use suitable cooling devices in order to maintain the desired polymerization temperature. This is necessary when a large quantity of material is to be polymerized in one batch. In order to utilize the heat liberated and to control the polymerization temperature more easily, it has been found advantageous in the case of emulsion polymerizations, for example, to place in a polymerization apparatus a small portion of the total amount of an emulsion to be treated, and to initiate the polymerization in this portion. When this portion of the emulsion reaches a certain temperature, for example, 60–70° C. the remaining cold emulsion is run in in such manner that the temperature is kept constant. Towards the end of the polymerization it is often necessary to supply heat externally.

Depending on the conditions of polymerization and on the starting materials used the polymeric compounds are obtained in the form of viscous solutions, granulates or in the form of emulsions. The products resulting from the polymerization may be used directly without further working up. It is often preferable, however, to work them up in a suitable manner before-hand. There may be added, for example, modifying substances such as softening agents, for example, dibutylphthalate or dioctylphthalate or sebacic acid esters, or organic or inorganic pigments or filling materials. The copolymerization of the monomeric compounds with other polymerizable compounds may also be carried out in the presence of substrata. Textile material is advantageously impregnated with a solution or emulsion of the monomers and then the copolymerization is brought about with the addition of a polymerization catalyst by heating the material.

As stated above, the products of the invention are advantageously polymerized with other monoethylenically unsaturated polymerizable compounds. As such compounds there are especially suitable those which contain the atomic grouping $CH_2=C<$, such as vinyl esters of organic acids, for example, vinyl acetate, vinyl formate, vinyl butyrate or vinyl benzoate and also vinyl alkyl ketones, vinyl halides, such as vinyl chloride or vinyl chloride or vinyl fluoride, vinylidene chloride or vinyl aryl compounds such as styrene and substituted styrenes, and also compounds of the acrylic acid series, such as esters of acrylic acid with alcohols or phenols, for example, ethylacrylate, butylacrylate, dodecylacrylate, acrylonitrile or acrylic acid amide and its derivatives substituted at the amide-nitrogen atom, and also analogous derivatives of methylacrylic acid, α-chloracrylic acid. There may also be used polymerizable olefines such as isobutylene, or hetero-cyclic compounds containing one vinyl group such as vinyl pyridine. Advantageously there are used derivatives of acrylic acid. Binary, ternary or more complex copolymers can be made, of which the properties can be regulated by suitable choice of starting materials, the relative proportions of the individual components and the conditions of polymerization.

The polymeric products obtainable by the process of the invention are suitable for a very wide variety of purposes. They are generally applicable for all purposes involving the use of polymerization resins or polymerization and condensation resins. They can be used for the manufacture of moulding masses and moulded bodies, films, fibers, adhesives or lacquers. Certain of the copolymers possess a rubber-like character, and are suitable as rubber substitutes which are resistant to benzene and benzine. The products, provided that they have been made from suitable starting materials, can be used, inter alia, as assistants in the textile, leather and paper industries. They can be used for the production of impregnations and coatings, for example, textiles may be rendered water-repellent by means of suitably substituted compounds. Other polymers are suitable for animalizing cellulose-containing textile materials, or as after-treating agents for improving the fastness to washing and water of dyeings or prints of water-soluble direct-dyeing dyestuffs which owe their solubility in water to the presence of sulfonic acid or carboxylic acid groups. Such an after-treatment may be coupled with an after-treatment with a copper salt. The new products may also be used for dyeing, printing and dressing natural or artificial fibers with pigments or for producing matt effects on polyamide fibers.

In general the products of the invention yield dressings which withstand wear well in use.

The following examples illustrate the invention, the parts being by weight:

Example 1

A mixture of 14.3 parts of β-diethylaminoethylvinyl ether and 9.35 parts of chloracetamide are heated in a boiling water bath for 6 hours while stirring. After cooling the mixture, 0.3 part of the unchanged vinyl ether is poured off, and the viscous resinous reaction mass is dissolved in 23 parts of water. In this manner there is obtained a solution of about 50 percent strength of the quaternary compound of the formula

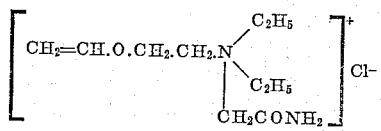

which solution can be used for polymerizations without further purification.

Example 2

A mixture of 14.3 parts of β-diethylaminoethylvinyl ether and 9.25 parts of epichlorhydrin is heated in a boiling water bath for 12 hours while stirring. After cooling the mixture, 8.6 parts of unchanged starting materials are removed, and the viscous residue is dissolved in 13.5 parts of water. There are obtained 27 parts of a solution of about 50 percent strength of the quaternary compound of the formula

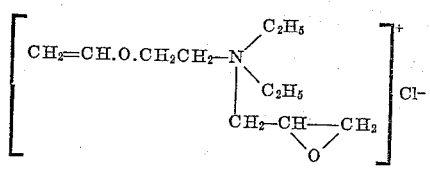

which solution can be used for polymerizations without further purification.

Example 3

21 parts of styrene and 6 parts of n-butyl acrylate are emulsified, while vigorously stirring mechanically or shaking, in a mixture of 6 parts of the solution of about 50 percent strength of the quaternary compound described in Example 1, 2 parts of trioxyethyl-lauryl-ammonium acetate, 0.1 part of isooctanol and 67 parts of distilled water. The emulsion is polymerized with the addition of 2 parts of a potassium persulfate solution of 10 percent strength, while stirring, at 70–80° C. for 5 hours. After filtering off a very small amount of coarse constituents, there is obtained a stable thinly liquid finely divided dispersion having a polymer content of 28 percent, which is suitable for dressing purposes, especially for the production of a matt effect on a fabric of finely fibrous polyamide.

Example 4

The procedure is the same as in Example 3, except that the quaternary ammonium compound used therein is replaced by the same quantity of the quaternary compound prepared as described in Example 2. There is likewise obtained a thinly liquid stable finely divided emulsion, which has a dry content of 28 percent and is suitable for dressing purposes.

Example 5

The procedure is the same as that described in Example 4, except that instead of 67 parts only 31 parts of distilled water are used for the emulsification. In this manner there is obtained a stable thinly liquid finely divided emulsion having a dry content of 46 percent.

An emulsion polymerization of styrene and n-butyl-acrylate carried out in a precisely analogous manner, but without the addition of a polymerizable quaternary ammonium compound, yields no emulsion and large masses of the copolymer separate out.

Example 6

A mixture of 31.45 parts of (β-morpholinoethyl)-vinyl ether of the formula

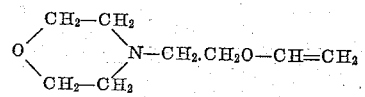

which is obtained in known manner by the action of acetylene on β-morpholino ethanol in the presence of a basic catalyst, and 18.70 parts of chloracetamide is heated in a boiling water bath for 6 hours while stirring from time to time. After cooling, the reaction mass is completely solidified. By the addition of 50.15 parts of water and heating, a solution of 50 percent strength of the quaternary ammonium compound of the formula

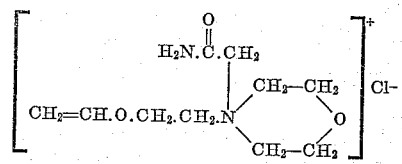

is obtained, which solution can be used for copolymerizations without further purification.

Example 7

25.22 parts of dimethyl sulfate (⅕ mol) are added dropwise at room temperature while stirring to a solution of 31.44 parts of (β-morpholino-ethyl)-vinyl ether (⅕ mol) in 50 parts of methylene chloride in the course of half an hour. The temperature rises owing to the reaction heat, and the solvent finally boils weakly under reflux. The whole is stirred for a further ½ hour until the reaction is completed, and a clear solution of 54 percent strength of the quaternary ammonium compound of the formula

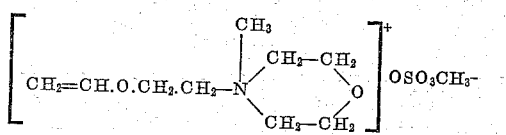

in methylene chloride is obtained, which solution is suitable for polymerizations.

In an analogous manner (β-morpholino-ethyl)-vinyl ether can be converted also with para-toluene sulfonic acid methyl ester into the corresponding quaternary ammonium compound when equivalent quantities of these compounds dissolved in methylene chloride are allowed to react together.

*Example 8*

12.61 parts (1/10 mol) of dimethyl sulfate are added dropwise in the course of 10 minutes while stirring to a mixture cooled to 0–3° C. of 19.99 parts (1/10 mol) of (β-di-n-butylamino ethyl)-vinyl ether and 32.6 parts of water. The temperature rises to about 27° C. owing to the reaction heat. The whole is stirred for 2½ hours at that temperature and for a further hour at 50–53° C. until the reaction is finished. The resulting clear, faintly yellow solution of approx. 50 percent strength of the quaternary ammonium compound of the formula $$\left[ CH_2=CH.O.CH_2.CH_2.\overset{\overset{\displaystyle C_4H_9}{|}}{\underset{\underset{\displaystyle C_4H_9}{|}}{N}}-CH_3 \right]^+ OSO_3CH_3^-$$

is suitable for polymerizations without further purification.

*Example 9*

12.61 parts (1/10 mol) of dimethyl sulfate are added dropwise at room temperature while stirring to a solution of 19.99 parts (1/10 mol) or (β-di-n-butylamino ethyl) vinyl ether in 32.6 parts of methylene chloride. Operations are continued as described in Example 7, and there is obtained a clear colorless solution of about 48 percent strength of the quaternary ammonium compound of the formula $$\left[ CH_2=CH.O.CH_2.CH_2.\overset{\overset{\displaystyle C_4H_9}{|}}{\underset{\underset{\displaystyle C_4H_9}{|}}{N}}-CH_3 \right]^+ OSO_3CH_3^-$$

which is suitable for polymerizations without further purification.

*Example 10*

37.5 parts of isobutyl acrylate and 10 parts of acrylonitrile are emulsified in a solution of 1.62 parts of [γ-(lauroylamido)-propyl]-trimethyl ammonium methosulfate in 57.5 parts of distilled water while stirring vigorously by mechanical means or agitating. To the emulsion are added 5 parts of the aqueous solution of 50 percent strength of the quaternary ammonium compound of the formula $$\left[ CH_2=CH.O.CH_2.CH_2.\overset{\overset{\displaystyle C_4H_9}{|}}{\underset{\underset{\displaystyle C_4H_9}{|}}{N}}-CH_3 \right]^+ OSO_3CH_3^-$$

described in Example 8 and 0.12 part of isooctanol. For the purpose of polymerization this emulsion is heated under nitrogen at 68° C., and a solution of 0.33 part of potassium persulfate and 1.63 parts of lauroyl-amidopropyl-trimethyl ammonium methosulfate in 15 parts of water is added gradually. Polymerization is completed after 2 hours. The resulting fine-particle emulsion has a dry content of 41.3 percent. When spread on a substratum and dried it forms a soft, rubber-like clear film and can be mixed with solutions of aluminium salt or cation-active softening agents without any signs of coagulation. The emulsion is absorbed substantively even from mixtures highly diluted with water on negatively charged textiles (for example, wool), and is eminently suitable when mixed with paraffin emulsions containing aluminium salt for the production of water-fast dressings.

*Example 11*

6 parts of acrylic acid amide are dissolved in 85 parts of distilled water and mixed with 8 parts of an aqueous solution of 50 percent strength of the monomeric quaternary ammonium compound from [(β-di-n-butylamino)-ethyl]-vinyl ether and dimethyl sulfate prepared according to Example 8.

The whole is heated to 65° C. under nitrogen and with stirring, and in the course of 2 hours a solution of 0.1 part of potassium persulfate in 2 parts of distilled water is added in portions. The mixture is then stirred for an hour at 65–70° C., after which polymerization is finished and a clear syrupy liquid is obtained. It has a polymer content of 9.95 percent and is suitable for the preparation of sizing agents which reduce the electrostatic charge of textiles or textile fibers.

*Example 12*

11.1 parts of the solution of 54 percent strength of the quaternary ammonium salt from (β-morpholino-ethyl)-vinyl ether and dimethyl sulfate in methylene chloride described in Example 7 are mixed with 54 parts of methyl methacrylate and 83 parts of ethylene chloride and heated to 88° C. while stirring. 2 parts of a solution of 10 percent strength of benzoyl peroxide in ethylene chloride are added gradually in the course of 3½ hours, and the whole is then heated for 1½ hours at the same temperature. A highly viscous weakly opal turbid solution of the copolymer from methyl methacrylate and the quaternary ammonium compound of the formula $$\left[ CH_2=CH-O-CH_2.CH_2.\overset{|}{\underset{\underset{\displaystyle CH_3}{|}}{N}}\overset{\displaystyle CH_2-CH_2}{\underset{\displaystyle CH_2-CH_2}{<}}O \right]^+ OSO_3CH_3^-$$

with a resin content of 39.8 percent is obtained.

The solution of this copolymer is suitable especially in admixture with organic soluble urea or melamine formaldehyde gum-lac for the production of high quality stoving lacquers.

What is claimed is:

1. A copolymerization product which contains copolymerized the quaternary ammonium compound of the formula $$\left[ \overset{\displaystyle C_2H_5}{\underset{\displaystyle C_2H_5}{>}}\overset{|}{\underset{\underset{\displaystyle CH_2-CONH_2}{|}}{N}}-CH_2-CH_2-OCH=CH_2 \right]^+ Cl^-$$

said quaternary vinyl ether being present in an amount sufficient to make said copolymerization product water-dispersible, butyl acrylate and styrene.

2. A liquid composition suitable for the dressing of textiles which comprises a stable aqueous dispersion of a copolymerization product of (a) a quaternary mono-vinyl ether which corresponds to the formula:

$$\left[ \overset{\displaystyle R_1}{\underset{\displaystyle R_2}{>}}\overset{|}{\underset{\underset{\displaystyle R}{|}}{N}}-R_3-O-CH=CH_2 \right]^{\oplus} X^{\ominus}$$

wherein R is a radical selected from the group consisting of lower alkyl radical, glycidyl radical and carboxamidomethyl radical; $R_1$ and $R_2$ taken together form a member selected from the group consisting of lower alkyl radical \
/ lower alkyl radical lower alkylene radical \
| / lower alkylene radical and lower alkylene radical \
O / lower alkylene radical $R_3$ is a lower alkylene radical in which two carbon atoms are linked to each other; and X is an anion; said quaternary vinyl ether being present in an amount sufficient to make said copolymerization product water dispersible and (b) at least one other monoethylenically unsaturated polymerizable compound.

References Cited by the Examiner

UNITED STATES PATENTS

| | | | |
|---|---|---|---|
| 2,617,781 | 11/52 | Lytton | 260—41 |
| 2,631,995 | 5/53 | Bruson | 260—85.5 |
| 2,683,125 | 7/54 | D'Alelio | 260—2.1 |
| 2,764,578 | 9/56 | Barney | 260—85.5 |
| 2,780,567 | 2/57 | Kine et al. | 260—29.6 |

OTHER REFERENCES

Butler and Goette: J. Am. Chem. Soc. 74, pages 1939 et seq., Apr. 20, 1952.

MURRAY TILLMAN, *Primary Examiner.*

PHILIP E. MANGAN, MILTON STERMAN, A. M. BOETTCHER, DONALD ARNOLD, *Examiners.*